(12) United States Patent
Chandrayana et al.

(10) Patent No.: US 9,282,012 B2
(45) Date of Patent: *Mar. 8, 2016

(54) COGNITIVE DATA DELIVERY OPTIMIZING SYSTEM

(71) Applicant: Twin Prime, Inc., Redwood City, CA (US)

(72) Inventors: Kartikeya Chandrayana, San Francisco, CA (US); Satish Raghunath, Sunnyvale, CA (US)

(73) Assignee: Twin Prime, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,459

(22) Filed: May 18, 2015

(65) Prior Publication Data

US 2015/0249582 A1   Sep. 3, 2015

Related U.S. Application Data

(63) Continuation of application No. 14/489,455, filed on Sep. 17, 2014, now Pat. No. 9,055,466, which is a continuation of application No. 14/078,481, filed on Nov. 12, 2013.

(60) Provisional application No. 61/810,018, filed on Apr. 9, 2013.

(51) Int. Cl.
| | | |
|---|---|---|
| *G06F 15/16* | (2006.01) | |
| *H04L 12/26* | (2006.01) | |
| *H04L 29/08* | (2006.01) | |
| *H04L 12/801* | (2013.01) | |
| *H04W 28/02* | (2009.01) | |
| *H04L 12/24* | (2006.01) | |
| *G06F 12/00* | (2006.01) | |

(52) U.S. Cl.
CPC .......... *H04L 43/04* (2013.01); *H04L 29/08072* (2013.01); *H04L 41/0823* (2013.01); *H04L 41/12* (2013.01); *H04L 41/145* (2013.01); *H04L 43/10* (2013.01); *H04L 47/14* (2013.01); *H04W 28/0231* (2013.01)

(58) Field of Classification Search
USPC .................. 709/203, 217–218, 223–229, 250
See application file for complete search history.

(56) References Cited

U.S. PATENT DOCUMENTS

| | | | | |
|---|---|---|---|---|
| 2005/0232193 | A1* | 10/2005 | Jorgensen | 370/329 |
| 2009/0287842 | A1* | 11/2009 | Plamondon | 709/233 |
| 2011/0047286 | A1* | 2/2011 | Harrang et al. | 709/233 |
| 2011/0280143 | A1* | 11/2011 | Li et al. | 370/252 |
| 2012/0117225 | A1* | 5/2012 | Kordasiewicz et al. | 709/224 |

* cited by examiner

*Primary Examiner* — Zarni Maung
(74) *Attorney, Agent, or Firm* — Wong & Rees LLP; Kirk D. Wong

(57) ABSTRACT

Network performance data is gathered and analyzed to produce network patterns and data delivery strategies. Client devices and other network components report network performance data to a central management system. Data delivery strategies are applied to a portion of a network to deliver content appropriate for network patterns that are associated with the portion of the network.

30 Claims, 5 Drawing Sheets

COGNITIVE DATA DELIVERY OPTIMIZING SYSTEM

CROSS-REFERENCE TO RELATED APPLICATIONS; PRIORITY CLAIM

This application claims benefit as a continuation of U.S. patent application Ser. No. 14/489,455, filed Sep. 17, 2014, which claims benefit of U.S. patent application Ser. No. 14/078,481, filed Nov. 12, 2013, which claims benefit of U.S. Provisional Application Ser. No. 61/810,018, filed Apr.9, 2013, the entire contents of the foregoing are hereby incorporated by reference as if fully set forth herein, under 35 U.S.C. §120.

TECHNOLOGY

The present invention relates generally to analysis of network performance data, and in particular, to cognitive analysis of network performance and end device data.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

A consequence of the diversity is the lack of a single overarching mechanism that can yield the best performance when it comes to data delivery. One-size-fits-all strategies borrowed from wired Internet do not work well. In terms of the content itself, it is highly personalized and dynamic. This defeats many of the optimizations that rely on caching.

Techniques that rely on compression or right-sizing content do not address the fundamental issues of network volatility and diversity as they impact the transport of data. Irrespective of the savings in compression, the data still has to weather the vagaries of the network, operating environment, and end device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
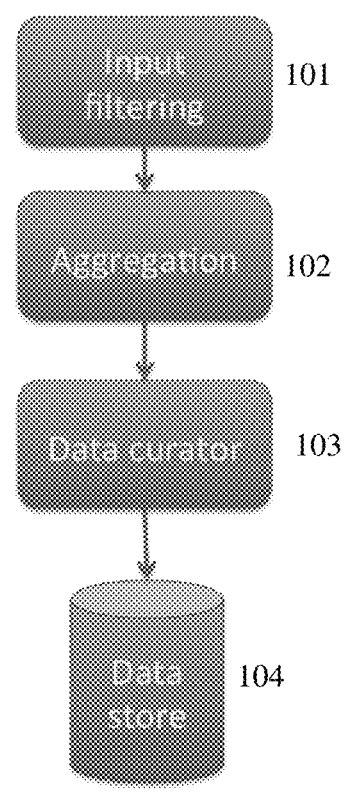
FIG. 1 illustrates a network data gathering block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. A COGNITIVE FRAMEWORK FOR HETEROGENEOUS NETWORKS
   2.1 GATHERING RELEVANT NETWORK DATA
   2.2 IDENTIFYING NETWORK PARAMETERS THAT MATTER AND RANKING STRATEGIES
   2.3 CROSS POLLINATION
   2.4 THE COGNITIVE FRAMEWORK IN ACTION
3. AN INSTANTIATION OF DATA DELIVERY OPTIMIZATION WITH THE COGNITIVE FRAMEWORK
   3.1 ACTIVE FEEDBACK FROM THE END-DEVICE
   3.2 OPERATING CONTEXT
   3.3 END-DEVICE BASED DATA DELIVERY STRATEGIES
   3.4 ACCELERATOR-BASED DATA DELIVERY STRATEGIES
      3.4.1 DETECTING ELASTICITY TO FORMULATE STRATEGIES
      3.4.2 TRANSPORT OPTIMIZATIONS FOR PERFORMANCE STRATEGIES
   3.5 AN EXAMPLE DATA STORE FORMULATION—THE EMPIRICAL PERFORMANCE STORE
      3.5.1 MEASURING EFFICACY OF PERFORMANCE STRATEGIES FOR CONTINUAL SELF-LEARNING
      3.5.2 AN EXAMPLE—DEALING WITH VOLATILITY IN THROUGHPUT
   3.6 NETWORK IMPRINT
4. EXAMPLES
   4.1 EXAMPLES APPLICATIONS
      4.1.1 ADVERTISEMENT DELIVERY
      4.1.2 CONSUMER MEDIA DELIVERY
      4.1.3 MOBILE COMMERCE
      4.1.4 ONLINE GAMING
      4.1.5 VIDEO DELIVERY
      4.1.6 SEARCH
      4.1.7 ONLINE REVIEWS
      4.1.8 TURN-KEY APPLICATION PLATFORMS
      4.1.9 SOCIAL NETWORKS
      4.1.10 REAL-TIME INTERACTIVE APPLICATIONS
      4.1.11 FILE EXCHANGE APPLICATIONS
      4.1.12 CLOUD HOSTED SERVICES
      4.1.13 ANALYTICS
      4.1.14 LOCATION-BASED SERVICES
      4.1.15 NETWORK PLANNING AND MANAGEMENT
      4.1.16 SCENARIO-DRIVEN SOFTWARE TESTING 4.2 TECHNIQUES THAT HELP DESCRIBE THE OPERATING CONTEXT
  4.2.4 DISCOVERING THE TYPE OF ACCESS NETWORK
  4.2.2 DISCOVERING THE UPSTREAM AND DOWNSTREAM BANDWIDTH OF THE ACCESS NETWORK
  4.2.3 DISCOVERING THE LOCATION OF THE DEVICE
4.3 HELPING ACCELERATION OF CONTENT DELIVERY
4.4 EFFICIENT CONTENT DELIVERY
5. IMPLEMENTATION MECHANISMS—HARDWARE OVERVIEW
6. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, and older technologies), WiFi (e.g., 802.11xx series of standards), satellite, and microwave. In terms of devices and software, there are smartphones, tablets, personal computers, network-connected appliances, and electronics that rely on a range of embedded software systems such as Apple iOS, Google Android, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.
b. The diversity in devices, operating system software and form factors results in a unique challenge from the perspective of user experience.
c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most of the network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to do the best at tasks such as data delivery.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. A COGNITIVE FRAMEWORK FOR HETEROGENEOUS NETWORKS

A range of parameters determines the performance of tasks such as data delivery. With volatility and diversity, there is an explosion in the number of parameters that may be significant. An embodiment of the invention automatically detects the parameters that have statistical significance and learns the strategies that lead to a better outcome.

Networks, devices and content are constantly changing. Embodiments are not tied down by assumptions on the current nature of the system. By automatically detecting the parameters of interest, there is scope to adapt to new technologies and usage patterns.

As new use-cases present themselves, embodiments are capable of dynamically arriving at the right definition of a desirable solution. This is enabled by the ability to automatically apply the strategies that best fit the scenario.

The cognitive process involves:
 a. Gathering relevant network data.
 b. Analyzing the data to learn parameters of significance and strategies for desirable outcomes.
 c. Storing and curating data so that it stays relevant as conditions in the network changes.

2.1 Gathering Relevant Network Data

Figure 2:
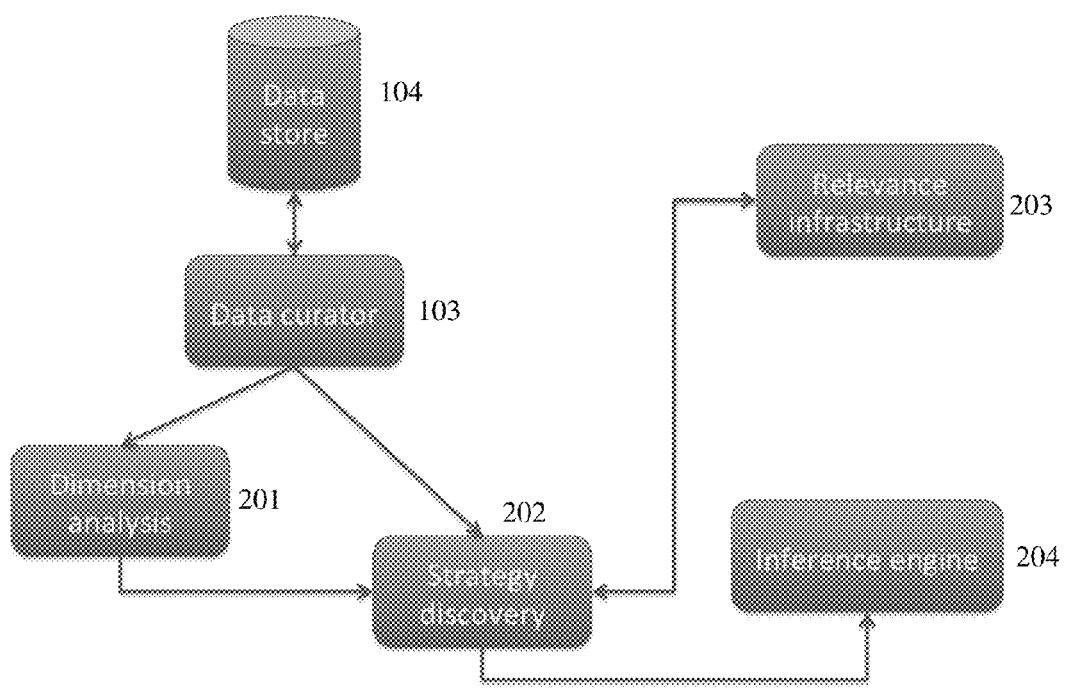
FIG. 2 illustrates a cognitive data processing block diagram, according to an embodiment of the invention.

Referring to FIG. 2, typical sources of data relating to the network environment are elements in the network infrastructure that gather statistics about transit traffic and end-devices that connect to the network as clients or servers.

The data that can be gathered includes, but is not limited to, any combination of: data pertaining to requests for objects, periodic monitoring of network elements (which may include inputs from external source as well as results from active probing), exceptional events (e.g., unpredictable or rare occurrences), data pertaining to the devices originating or servicing requests, data pertaining to the applications associated with the requests, data associated with the networking stack on any of the devices/elements that are in the path of the request or available from any external source, etc.

Requests for objects from the network include, but are not limited to, any combination of: data about the real-time operating conditions (discussed below), strategies deployed to retrieve the data on the end-device and to improve performance in the network elements, observed outcomes after the fact, etc.

Periodic monitoring of network elements provides a health map of the infrastructure. In cases of events that are unexpected, such as failures in different aspects of the network, sudden spikes in traffic etc., quantification of such events forms the data.

An input filtering module 101 processes such a diverse set of data sources by determining the utility and fidelity of the data. For example, the input filtering module 101 may implement input filtering strategies that may include, but are limited to, any combination of: protocol related checks to verify the sanity of data (e.g., any information that violates known characteristics of the protocol may be discarded, etc.), network infrastructure related checks (e.g., any information that seems to violate what is reasonable for current networks may be flagged or discarded, etc.), device related checks (e.g., any information that seems to be unnecessary or unreasonable for a device may be discarded, etc.), content-type related checks (e.g., if the type of content being requested is known then any information which is deemed inefficient for delivery, display or storage of the associated content type may be discarded, etc.).

A data aggregation module 102 recognizes whether the information gathered adds to what is already known in a significant way or if it is just a refinement of what is known. The data aggregation module 102 may use a variety of techniques to make this judgment. For example, if the data aggregation module 102 receives a bandwidth measurement for a particular geographic location, time-of-day, and end-device that was measured and categorized previously, the aggregation mechanism may decide (e.g., by policy, heuristics, set parameters, etc.) to increase a weighting of the previously received piece of information rather than adding a new item into the data store if the data had been new to the database.

The data additions and modifications are then handed over to a data curator 103 that is tasked with organizing and overseeing the data store. The data curator 103 uses heuristics to manage the data store so that information stays relevant. The functions of the data curator 103 include, but are not limited, any combination of: pruning expired data from the data store 104, providing fast lookup by using relevant key types, adapting the data store 104 for growth, etc. These functions may be performed periodically, on demand, on a time schedule, etc.

The strategies that decide how data is pruned and kept relevant are unique to this framework. It is also an important aspect of what makes the framework sustainable.

An embodiment automatically learns the efficacy of data by examining the feedback from the network, e.g., certain observed network performance metrics may actually be the property of a particular version of a software system in the end-device, etc. A software update may change such behavior and lead to the invalidation of the associated information. In such situations when this information is deployed toward optimizations, there may be little benefit or a negative impact. Such pruning is usually not predictable.

An embodiment learns thresholds that are intrinsic to various parts of the network that may require recalibration of collected information, e.g., the average expected load in a particular part of the network might be a function of the number of users using the network, etc. As the number of users grows, a pruning action may be needed to discard data from the past when user count was beyond a particular threshold. This class of pruning is predictable over time.

2.2 Identifying Network Parameters that Matter and Ranking Strategies

Referring to FIG. 2, a block diagram shows modules involved in an embodiment that process the stored information to arrive at strategies that lead to desirable outcomes. The dimension analysis module 201 identifies which network parameters are significant. The dimension analysis module 201 looks at the harvested network parameters and relates the changes in desired outcomes. This module combines heuristics and mathematical analysis, e.g., the set of network parameters that may be collected varies with end-devices, etc. One way to improve the utility of available information is by defining an equivalence between different kinds of parameters. For example, the vendor model of an end-device might sufficiently imply the network technology type that the device uses. The other way heuristics play an important role is by seeding the analysis with groups of parameters to test. This has the potential to greatly reduce the computation and time required to discover significant parameters, e.g., for data delivery performance the combination of end-device vendor name, geographic location, and time-of-day may form a significant set of parameters. The dimension analysis module 201 can produce a list of parameter combinations that are strongly correlated to some observed performance metric.

The strategy discovery module 202 rank orders the strategies that may be deployed for the set of significant parameters. The strategy discovery module 202, may employ several mechanisms to determine the efficacy of a chosen tactic. Two example mechanisms may include, but are not limited to, any of: 1) using a controlled test-bed that may be described as a "relevance infrastructure" that allows the strategy to be tested in a representative simulation of a set of real-world scenarios, or 2) a limited deployment of the strategy in a chosen subset of devices in the real network with accompanying instrumentation to measure outcomes. Thus, the strategy discovery module 202 can evaluate various applicable strategies against a set of significant network parameters to rank order the strategies.

An embodiment iterates strategies using a distinct set of algorithmic steps or heuristic steps that broadly identify a category that is chosen, e.g., a category of strategies could be the number of distinct transport streams that are used to transfer data, etc.

An embodiment selects the parameters that define how the strategy is instantiated. For example, for the above example of the number of distinct transport streams that are used to transfer data, different instantiations would involve trying a single stream, two streams and so on until an exhaustive set of instantiations are tested against the relevance infrastructure described below.

The relevance infrastructure 203 tests the strategies discovered with a realistic environment to estimate the likely outcomes if they are deployed in the real world. For a chosen strategy and its instantiation, the relevance infrastructure 203 provides an indication of whether it has a positive impact on the desired outcome. The relevance infrastructure is specialized for networking issues that include, but are not limited to, any combination of: representative end-devices, traffic patterns, parameters for strategies and traffic patterns, etc.

For representative end-devices, the relevance infrastructure 203 distills the characteristics of end-devices that matter from the perspective of the network infrastructure, where a set of representative end-devices is emulated.

For traffic patterns, the relevance infrastructure 203 uses periodic observations of live traffic to identify stationary trends that then allow meaningful traffic patterns to be defined.

The relevance infrastructure 203 measures parameters of significance by capturing values of all the significant parameters for a particular set of strategies and traffic patterns, to arrive at a well-defined result. A well-defined result in this example is a set of measured outcomes for certain values of significant parameters along with the chosen strategies. Results that are not qualified by the right parameters are not useful.

The strategies that perform well in the relevance infrastructure 203 are then made available to interested entities via the inference engine 204. With the results of relevance tests, the strategy discovery module 202 can make a judgment on which strategies to deploy to the inference engine 204. Once deployed, inference engine 204 is able to relate the input parameter set to the most closely matched rank-ordered performance strategies.

2.3 Cross Pollination

Several underlying components that make up a modern network share characteristics across geographies, operators, and vendors. Thus it is very beneficial to be able to leverage information about the network from one set of operating conditions for tasks associated with another distinct set of operating conditions. This is in essence the goal of cross-pollination.

Figure 3:
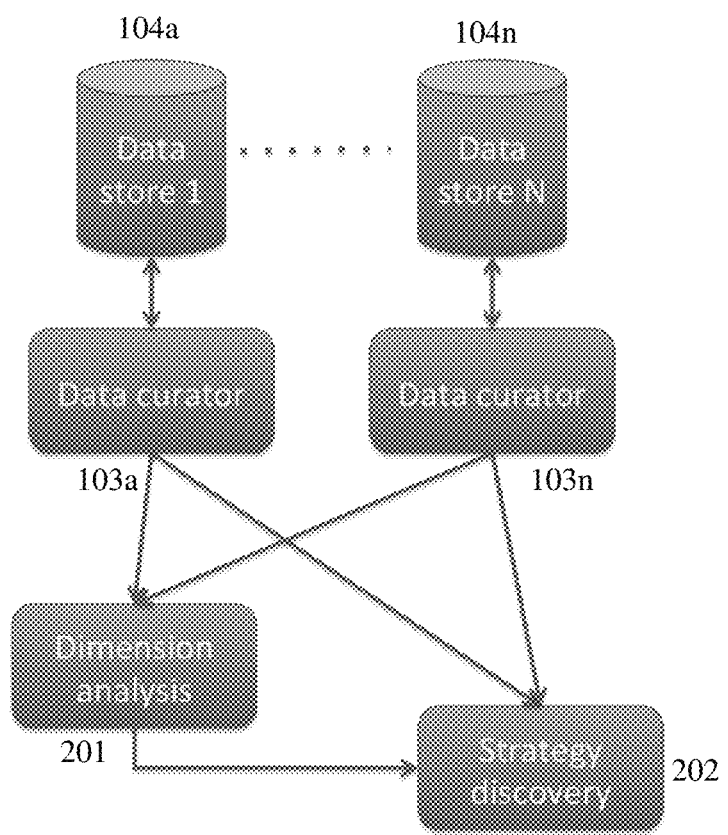
FIG. 3 illustrates a cross-pollination information gathering block diagram, according to an embodiment of the invention.

FIG. 3 illustrates cross-pollination during dimension analysis and strategy discovery. In this example, there are multiple data stores 104a-104n, that store information that may be of interest for a particular task. The dimension analysis module 201 polls each data curator 103a-103n, for potentially useful pieces of information to incorporate in its search, e.g. if a particular region uses LTE technology in an urban environment of some fixed dimensions and there is not much by way of samples to arrive at a conclusion, the process can be helped by polling other data stores for a "similar" set of operating conditions.

Similarly, with the strategy discovery module 202, the strategy discovery module 202 goes one step further in being able to utilize information about strategies used in "similar" operating conditions.

When the inference engine 204 receives a query for the best strategies for an operating condition, a similar cross-pollination is carried out—the inference engine 204 polls other inference engines for "similar" operating conditions to provide a better response than an empty one.

Thus it is important to be able to efficiently determine what "similar" means with reference to various stages of analysis. A mix of pre-specified policy and learning makes this determination:

a. A pre-specified policy is better at incorporating information from sources that are not typically available in the traffic stream or by polling any of the network infrastructure elements, e.g., the amount of spectrum owned by two operators is an interesting metric if the conclusion involves maximum achievable performance.

b. With information that is available in the traffic stream, information such as correlation between chosen strategies and outcome can seed a learning process that determines which operating environments are similar.

2.4 The Cognitive Framework in Action

The cognitive framework represents a good balance between adaptability and specialization for network related tasks. The framework features components that harness various sources of information typically available in modern heterogeneous networks. Leveraging insights about network technologies, the framework is tuned to analyzing data of significance. This helps it scale to the enormous sizes of networks that are common today. Equally important is the design that provides the right mix of agility in terms of response to inference queries and breadth of information analyzed. This ability to provide fast responses to real-time queries that may leverage large-scale data analysis is unique since it requires insights specific to how various network technologies work and interact with desired outcomes.

3. AN INSTANTIATION OF DATE DELIVERY OPTIMIZATION WITH THE COGNITIVE FRAMEWORK

Figure 4:
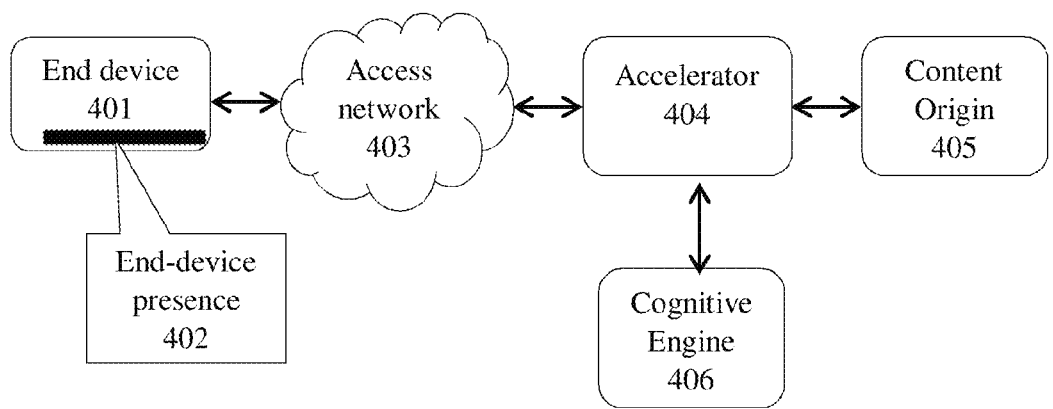
FIG. 4 illustrates a cognitive framework for optimizing data delivery, according to an embodiment of the invention.

FIG. 4 illustrates components of a network where the data delivery is optimized by way of the cognitive framework. A component may be installed in the end-device 401 (end-device presence 402 that provides inputs about the real-time operating conditions, participates and performs active network measurements, and executes recommended strategies.

An accelerator 404 sits in the path of the data traffic and executes recommended strategies in addition to gathering and measuring network related information in real-time.

A cognitive engine 406 aggregates information from both the accelerator 404 and the end-device presence 402, curates the information and processes it to continually evolve new strategies to achieve better outcomes.

While FIG. 4 illustrates elements for a certain class of data delivery optimizations, the framework is much more flexible. There are network scenarios where there is very little or no control of the end-device environments. In such cases, an embodiment scales down gracefully in applying the subset of learning techniques that are known to be reliable with just the accelerator 404 as the source of information. Further, in some embodiments, there are applications outside of data delivery where the cognitive engine 405, in isolation, acts as a service that provides rich analysis and recommendations.

3.1 Active Feedback from the End-Device

By inserting an agent in the end-device 401 to report the observed networking conditions back to the accelerator, estimates about the state of the network can be vastly improved. The main benefits of having a presence on the end-device 402 include the ability to perform measurements that characterize one leg of the session, e.g., measuring just the client-to-server leg, etc.

With real-time feedback from the end-device 401, it is easier to categorize deviations from observed historical performance as either transient events or prolonged problems in the network. The way the accelerator reacts to transient events is different than the way it reacts to prolonged problems in the network. This results in much higher performance since over-reaction to adverse network signals such as losses are avoided.

The other role of an end-device agent 402 is to deploy appropriate optimizations at the behest of the accelerator. Depending on the history gathered for a specific operating context, the end-device based agent may be instructed to deploy certain strategies such as pre-fetching or setting device network parameters or other performance strategies as discussed below.

Another example of utilizing end-device presence is to deploy alternate transport protocols which best suit the need of the measured operating conditions.

3.2 Operating Context

The performance of data delivery is closely tied to the operating conditions within which the end-device is operating. With ubiquitous wireless access over cellular and WiFi networks, there is a lot of volatility in operating conditions, so acceleration techniques must adapt to such a network by adapting to these conditions, e.g., the performance achievable over a private WiFi hotspot is very different from that with a cellular data connection. The accelerator 404 dynamically adapts to these conditions and picks the best strategies based on the context.

The context captures the information about the operating conditions in which data transfer requests are being made. This includes, but not limited to, any combination of:

Type of device, e.g., iPhone, iPad, Blackberry, etc.
    This may also include the version of the device and manufacturer information.

Device characteristics, e.g., the type of its modem, CPU/GPU, encryption hardware, battery, NFC (Near Field Communication) chipset, memory size and type or any other hardware information that impacts performance.

Mobility of device, e.g., whether the device is on a moving vehicle/train etc., or is stationary/semi-stationary.

Operating System on the device.

Operating System characteristics, e.g., buffering, timers, public and hidden operating system facilities (APIs), etc.
    This may also include operating system limitations such as number of simultaneous connections allowed to a single domain, etc.

Usage information related to various device elements, e.g., Memory, Storage, CPU/GPU etc.

Battery charge and mode of powering the device.

Time of day.

Location where available.

IP Address and port numbers.

Network type, e.g., WiFi or Cellular, or 3G/4G/LTE, etc., or Public/Home WiFi, etc.
    SSID (Service Set Identifier) in WiFi networks.
    802.11 network type for WiFi networks.

Service Provider information, e.g., AT&T or Verizon for cellular, Time Warner or Comcast for WiFi, etc.

Strength of signal from the access point (e.g., Wi-Fi hot spot, cellular tower, etc.) for both upstream and downstream direction.

Cell-Tower or Hot-Spot identifier in any form.

Number of sectors in the cell tower or hot spot.

Spectrum allocated to each cell tower and/or sector.

Any software or hardware limitation placed on the hotspot/cell tower.

Any information on the network elements in the path of traffic from device to the content server.

Firewall Policy rules, if available.

Any active measurements on the device, e.g., techniques that measure one-way delay between web-server and device, bandwidth, jitter, etc.

Medium of request, e.g., native app, hybrid app, web-browser, etc.
    Other information describing the medium, e.g., web browser type (e.g., Safari, Chrome, Firefox etc.), application name, etc.

Any other third party software that is installed on the device which impacts data delivery performance.

Content Type, e.g., image, video, text, email, etc.
    Also includes the nature of content if it is dynamic or static.

Content Location, e.g., coming from origin server or being served from a CDN (Content Delivery Network).
    In case of CDN any optimization strategies being employed, if available.

Recent device performance statistics, e.g., dropped packets, bytes transferred, connections initiated, persistent/on-going connections, active memory, hard disk space available, etc.

Caching strategies if any, that are available or in use on the device or by the application requesting the content.

In case of content where multiple objects have to be fetched to completely display the content, the order in which requests are placed and the order in which objects are delivered to the device. The request method for each of these objects is also of interest.

Based on the operating context, the cognitive engine 406 is able to recommend, but is not limited to, any combination of: end-device based data delivery strategies and accelerator-based data delivery strategies 3.3 End-Device Based Data Delivery Strategies End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:

Methods used to query the location of service point, e.g., DNS, etc.
    This may involve strategies that include, but are not limited to, any combination of: choosing the best DNS servers based on response times, DNS prefetching, DNS refreshing/caching, etc.

Protocols available for data transport, e.g., UDP, TCP, SCTP, RDP, ROHC, etc.

Methods to request or send data as provided by the operating system, e.g., sockets, CFHTTP or NSURLConnection in Apple's iOS, HttpUrlConnection in Google's Android, etc.

Session oriented protocols available for requests, e.g., HTTP, HTTPS, FTP, RTP, Telnet, etc.

Full duplex communication over data transport protocols, e.g., SPDY, Websockets, etc.

Caching and or storage support provided in the Operating System.

Compression, right sizing or other support in the devices to help reduce size of data communication.

Transaction priorities which outline the order in which network transactions to be completed:
    E.g., this may be a list of transactions where the priority scheme is simply a random ordering of objects to be downloaded.

Content specific data delivery mechanisms, e.g., HTTP Live Streaming, DASH, Multicast, etc.

Encryption support in the device:
    Also includes secure transport mechanisms, e.g., SSL, TLS, etc.

VPN (Virtual Private Network) of any kind where available and/or configured on the device.

Any tunneling protocol support available or in use on the device.

Ability to use or influence rules on the device which dictate how the data needs to be accessed or requested or delivered.
    This includes, but is not limited to, any combination of: firewall rules, policies configured to reduce data usage, etc.

Ability to pick the radio technology to use to get/send data. For example, if allowed the ability to choose cellular network to get some data instead of using a public Wi-Fi network.

Ability to run data requests or process data in the background.

Threading, locking, and queuing support in the Operating System.

Ability to modify radio power if available.

Presence and/or availability of any error correction scheme in the device.

In cases where middle boxes in the network infrastructure have adverse impact on performance, capabilities on the end-device to deploy mitigations such as encrypted network layer streams (e.g. IPSec, etc.).

3.4 Accelerator-Based Data Delivery Strategies

Accelerator-based strategies include techniques that may be deployed in the backend that include, but are limited to, any combination of:

- Transport optimizations that involve adapting behavior of existing layer 4 mechanisms to the specific operating context.
- Proxy services that allow introduction of support for secure or pipelined full duplex communication, e.g., WebSockets, TLS, Google's SPDY, HTTP pipelining, etc.
- Caching, right sizing, and compression based strategies.
- Transport connection pooling for efficient transfer of data from the origin to the accelerator 404.
- Optimizations to improve data delivery performance between the accelerator and content origin 405, e.g., enabling high performance transport strategies when the content origin 405 supports it.
- Proactive push strategies to anticipate object requests from the client.
- Re-ordering and prioritization of transactions to achieve better overall end-user performance.
- Cross subscriber strategies that detect and optimize for shared resources, e.g., resources in the access network or end-device location characteristics, etc.
- Specialized strategies tailored to transit operators traversed by particular sessions.
- Policy driven optimizations that allow customers to refine specific strategies, e.g., graceful downgrade of service quality in certain network scenarios.
- "Elasticity" detection and use in determining minimum service guarantees for a session.
- Error correction and coding strategies, e.g. in high loss environments the additional overhead of error correction may be worth the boost in performance.
- Network technology related optimizations to how data transfer is conducted, e.g. 3G networks feature a very different scheduling discipline than 4G networks. The backend may detect such cases and opportunistically deliver data.
- Strategies to speed up service discovery, e.g., DNS latencies may be cut by anticipating name resolution needs and caching them appropriately.
- Adapting representation of content to favorably impact transport characteristics, e.g., content that may require several connections may be coalesced and delivered, e.g., in the form of an image map.
- Rewriting hyperlinked content to reduce domain diversity and allow for specific proxied services, e.g., fewer domains referenced may result in lower name resolution latency, fewer connections and faster transfer.
- Offloading rendering related tasks to speed up end-device performance.
- Application layer routing of requests to serve content from a "better" accelerator 404/content origin 405.

3.4.1 Detecting Elasticity to Formulate Strategies

Application performance properties are defined by elasticity, e.g., the way it responds to changes in latency and bandwidth:

1) Delay sensitive: Such applications become unusable if the network latency exceeds a particular threshold. An interactive game may rely on the player's perception of acceptable latency. Under contention, a resource scheduler could prioritize such applications. If the application relies on the timely exchange of short pieces of data, it is likely to do well even if there is lower bandwidth for it. Thus, detecting the acceptable delay could provide a useful delay budget with which the scheduler can apportion resources.

2) Delay adaptive: An application may be capable of detecting changes in network latency and adapt its behavior to the detected changes. In such scenarios there is likely to be a larger range of acceptable latency values over which the application performs well. Examples of such applications include recorded video that uses buffering to reduce effects of latency. From the perspective of the resource scheduler, such applications may be associated with a delay budget and a mechanism to signal changing latencies to the application. Under contention, a limited amount of delay may be introduced and signaled to the application in order to improve network performance without impacting the application. In some cases it may even be possible to buffer and deliver data at a much later point in time.

3) Bandwidth sensitive: There may be a minimum requirement on the bandwidth to use such an application. A popular example is interactive voice. The resource scheduler may use knowledge of the rate threshold to avoid allocations higher than what is necessary when there is a crunch.

4) Bandwidth adaptive: These applications can detect changes in bandwidth and adapt to it. Typically applications react in a way that maximizes the user's perceived performance. For example, an adaptive video application may choose to transmit a stream that is encoded at lower rate. When adverse network conditions are detected, the resource scheduler may employ knowledge of such applications to signal a change in bandwidth thereby reducing any lag in application adaptation. The scheduler may choose to drop packets if resources are constrained. On the other hand, improved conditions can trigger a signal to the application to leverage the newly available resources.

5) Loss adaptive: An application that responds to losses detected in the network falls in this category. This usually happens as an indirect consequence of the transport protocol chosen by the application. If packet drops are to be doled out by a resource scheduler with such an application in the mix, either the cost of application performance has to be acceptable or a transport level proxy has to make sure the packet drops are not conveyed to the sender.

Sometimes, an application can be automatically characterized into one of the elasticity buckets by using publicly available information; for example, streaming video can be characterized as a delay adaptive application. However, when such information is not readily available, the elasticity of the application can be identified using its time domain signature. Also, some application types may be characterized by multiple elasticity types, for example, a streaming video initially could be delay sensitive and then, with appropriate buffering at the end system, may fall into the delay adaptive application type. The ability to identify the appropriate elasticity type (or types) and its correlation with the performance in real-time by observing characteristics of the data is a unique approach implemented in embodiments described herein. Further, the actions available to impact performance of the applications grouped by their elasticity are of particular interest to the system. Table 1 lists some of the performance strategies available to optimize traffic based on the different forms of elasticity.

TABLE 1

Application performance properties affected by resource scheduling

| Application Elasticity Type | Performance strategies |
| --- | --- |
| Delay sensitive | Detect acceptable network latency ranges for application and provide feedback to origin |
| Delay adaptive | Help applications fully leverage acceptable delay ranges to push more data |
| Bandwidth sensitive | Detect acceptable bandwidth ranges for application and provide feedback to origin |
| Bandwidth adaptive | Help applications fully leverage range of acceptable rates to provide service |
| Loss adaptive | Help applications fully leverage range of acceptable link quality ranges for service |

3.4.2 Transport Optimizations for Performance Strategies

A primary mode of transport for data is TCP. Although TCP incorporates a sophisticated bandwidth discovery and congestion control algorithm, it is limited in what it can achieve by way of performance due to a few factors:

a) TCP operates on a per-connection basis. It starts from scratch for each and every connection when it does a search for the optimal operating point.

b) TCP has to work for every kind of Internet connected device and hence has to be inherently conservative in assumptions relating to parameters of operation.

Mobile networks with their volatility and diversity present a challenge to traditional TCP based delivery. Traditional solutions to improve data delivery performance fall into the following categories:

a) Moving the content closer to the requester by way of caching.

b) Reducing the amount of data transmitted by eliminating redundancy, compression, and right-sizing.

c) Modifying TCP congestion control algorithm to temper its reaction to reordering or losses.

These techniques fall short of tackling the main problem—which is that even in the presence of no losses or other impairments, performance can be sub-optimal due to the shifting operating conditions.

The solution is in moving away from the assumption that one single algorithm or strategy can deliver the best performance in all situations. By recognizing that many of the operating parameters of TCP may need customization in real-time, an embodiment arrives at a new paradigm for data delivery over cellular networks. It achieves this real-time customization by:

a) Discerning the implicit information about the state of the network available in the protocol layer b) Correlating current operating context to relevant scenarios using accumulated knowledge c) Combining these pieces of information with active feedback from the client There are several aspects of packet traffic at the transport protocol level that provide indirect hints on the state of the network, e.g., inter-packet delays as an indicator of bottleneck throughput, round-trip and one-way latency trend as an indicator of bottleneck queue occupancy, protocol specific indicators that include, but are not limited to, any of: selective acknowledgements, timestamps, segment sizes, advertised windows as factors that can help detect congestion in the network, etc.

Protocol layer information is a continuous feed that influences the accelerator's view of the current state of the network. With these two sources of information (the accumulated knowledge of performance strategies that work for the current operating context and the real-time feedback on the state of the network) the transport optimizations are tailored to the situation. The transport optimizations involve two phases of the connection:

a) The bandwidth discovery phase is considerably shortened b) During the life of the connection, the transport protocol itself is faster to react to changes in the network making it very opportunistic.

Due accumulated knowledge of operating conditions, the transport protocol can be a more aggressive in how it reacts to changing network scenarios.

3.5 An Example Data Store Formulation—the Empirical Performance Store

In an embodiment, an operating context may be defined in terms of a fixed set of attributes of a mobile session such as the location, time-of-day, device type, and software platform on the device. For each such operating context, the impact of strategies on performance may be measured as the values of certain representative metrics such as round trip latency, throughput, loss rates, and jitter. Thus the data store contains bucketed operating context vectors along with measured results for performance strategies applied in those contexts.

Such a data store would be queried to track the empirically measured performance for various operating contexts. The underlying assumption is a reasonable stationarity in metrics tracked. The data associated with each operating context has an expiry time after which it is discarded. New inputs for the same operating context are accumulated by way of aggregate statistics of each interesting metric.

3.5.1 Measuring Efficacy of Performance Strategies for Continual Self-Learning

An operating context is associated with results for specific performance strategies in order to facilitate self-learning. When the optimizer deploys a particular strategy at either the backend or on the front-end, the corresponding records added to the data store may have an annotation to describe the strategy. In order to best leverage data across several strategies, annotations may be defined that capture a family of strategies, e.g., if the efficacy of multiple parallel connections is to be tested for various operating contexts, the recorded data may be annotated with the multiple connections tag. Thus a query on the data store for this tag would give performance measurements for all cases where there were two or more connections. Each record may then include an additional field that specifies how many connections were in fact used.

Periodically the optimizer can deploy a representative strategy from each family of optimizations against an operating context. Such data would help identify the best strategies to use for new operating contexts as they appear in the network, e.g., a new service or API may become popular among applications and result in new ways of accessing the network. It would then be an automatic process for the optimizer to learn which of the known optimization strategies works best with the new operating contexts.

3.5.2 An Example—Dealing with Volatility in Throughput

The type of network, location and time of day largely define throughput. Knowing the range of throughput for an operating context results in drastically cutting the time to discover the best bandwidth. The likelihood of finding the right parameters for the transport protocol is much higher. Thus, even though there is a lot of volatility in expected network performance, seeding the real-time bandwidth search with prior knowledge cuts the effort required and avoids adverse results.

3.6 Network Imprint

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However there is a lot of information about the network available in the transit traffic itself—from billions of devices consuming data. This information that describes network operating characteristics and defines efficacy of data delivery strategies is called a "network imprint". The approaches described herein allow embodiments to compute this network imprint.

4. EXAMPLES

Optimization techniques can be employed to accelerate content over modern heterogeneous networks. The example applications illustrate practical scenarios where embodiments may be applied. The example scenarios below help describe the operating context and the use of the operating context information to accelerate content delivery or discovery.

4.1 Example Applications

4.1.1 Advertisement Delivery

Online advertising involves delivering a set of objects to the end-device that results in a display of a creative composition to the consumer. The faster the rendering of the advertisement, the higher the effectiveness; consumers become demonstrably more engaged with the advertising, thereby increasing the return on investment for the advertiser. The volatile nature of today's wireless networks makes it very challenging to achieve this speed and efficiency in rendering the advertisement on end-devices e.g., wireless devices, etc., that are increasingly consuming this type of content.

An embodiment resolves this issue by embedded a client-component in the end-devices (e.g., as a software library that may be packaged along with existing advertising network software, etc.) that communicates with a cloud-based accelerator and cognitive engine. By leveraging inputs from the cognitive engine, the advertisement is delivered in a far shorter time budget and with much lower failure rates. Some of the optimizations that may be deployed include, but are not limited to, any of: heuristics based on file sizes for small advertisements, managing middle-box behavior efficiently to reduce queuing in the network, fast discovery of ideal bandwidth, etc. This dramatically improves the efficacy of advertising.

4.1.2 Consumer Media Delivery

With increasing compute and memory resources at the end-devices, it is common to deliver a rich user experience as part of a variety of applications today. Examples of such applications include: news, literature, online journals, forums, bulletin boards, blogs, opinion magazines, etc. With a volatile wireless network, delivery of rich media objects is marked by increased latency and failure. From a user's perspective, the experience is frustrating because the media takes a long time to be formed on the end-device in a manner suitable for consumption.

In an embodiment, some of the optimizations that can used to resolve these issues include, but are not limited to, any of: strategies for large file sizes, ability to automatically select suitable session-based protocols to help prioritize download order of objects, etc. Depending on the operating context, the right set of strategies delivers a consistent and superlative user-experience for such applications. This drives up both user-loyalty and engagement, which are tied to higher revenue.

4.1.3 Mobile Commerce

The personal nature of modern mobile devices has caused a surge in commerce related traffic. Such data is dynamically generated for a particular transaction and transmitted over encrypted channels because a payment is involved. This defeats existing techniques to accelerate delivery such as caching—not only is the content seldom cacheable, the encrypted nature does not allow an intermediary to examine the contents of what is transmitted. However, performance of such data transfers is crucial to successful completion of a sale. Consumers often abandon a purchase at this stage if the performance is not up to the mark.

Because the optimizations used in embodiments described herein are content agnostic and can be applied to encrypted streams, a variety of strategies described earlier can be applied to improve the performance of such sessions. For example, transport optimizations can ensure a much speedier transaction completion leading to lower abandonment of purchases by consumers.

4.1.4 Online Gaming

Online gaming applications feature frequent exchange of data between participants of the game. The success of the game itself is highly dependent on making these interactions as fast as possible. As part of these interactions, participants may exchange several types of data, e.g., status information about the ongoing game, personal information related to the profile of the participant, payment information for purchases made within the application, creative components downloaded for a new part of the game, etc. As with other applications that exchange latency-sensitive data or transaction-oriented data that impacts revenues, gaming applications require a variety of optimizations that deal with network related issues.

With cognitive analysis, one embodiment may involve detecting the nature of data being exchanged without having to analyze the contents of data transmitted in order to understand elasticity of the traffic. Such detection may in turn lead to other optimizations being deployed for the transport protocols or for handset-based interventions to improve prioritization, pre-fetching, etc. The impact of such optimizations is to enhance engagement of users, improve retention, and consequently drive broader popularity of the game.

4.1.5 Video Delivery

With video consumption, the metrics of interest vary with the operating context. A user consuming a video on a desktop computer is likely to have a different expectation of the session than one with a handheld device. With a handheld device, the time to first frame of video loading and rendering is critical to improve viewership. In addition, consumers on handheld devices are likely to be browsing several videos, viewing short snippets of each rather than watching for extended periods of time. This implies that just end-device based buffering and caching is not sufficient (and sometimes not even effective) in improving user experience.

An embodiment can improve the video experience. In order to achieve a low time to first frame metric, it is important to get the transport strategy right the first time. A decision aided by past history for the operating condition is invaluable here. Further, detecting the elasticity of the application allows a range of optimizations that can influence the origin server to serve the right quality of content for the situation. During the download of the video, if the user is engaged for an extended period, another set of optimizations for large file downloads ensures the end-device based player does not stall in the middle of a viewing. The consequence of these optimizations is higher viewership of videos, the central goal of many video delivery systems.

4.1.6 Search

Search is the primary mechanism by which consumers discover content and services on the Internet. Often search queries are placed with a time-bound intent to act on the information retrieved, e.g., a consumer may search for a restaurant close to his or her current location. Thus timeliness is a very important attribute of search performance, next only to correctness or relevance of results.

Depending on the nature of results being retrieved, several aforementioned techniques may be employed by an embodiment to cut the time to deliver search results, e.g., an image search application benefits from optimizations for large files, a real-estate search application may benefit from optimizations that speed up retrieval of objects from several origins of content by using intelligent prioritization, etc.

4.1.7 Online Reviews

Several applications provide user-generated and expert-curated reviews for a variety of services, e.g., restaurant reviews, auto repair reviews, movie reviews, etc. With handheld devices, consumers summon such reviews when there is a strong intent to follow-up with a purchase. So it is very important to provide fast access to the information that may help a consumer's purchasing decision.

Similar to search results above, depending on the nature of the content, a variety of optimizations may be applied by an embodiment to help deliver a faster experience for such applications.

4.1.8 Turn-Key Application Platforms

Application platforms provide rapid development tools to businesses that wish to release mobile applications. Businesses that wish to leverage the popularity of a particular handheld device platform need not build in-house technical expertise to build software for such platforms. Instead, they can employ a turnkey application developer or development platform to deliver their content or service. In such scenarios, it is the application platforms' responsibility to ensure the best performance.

In an embodiment, an application platform may integrate a client-component to steer data traffic through a backend with cognitive assistance so that, independent of the nature of the enterprise content, the best performance may be achieved. The content agnostic optimizations described herein are thus very relevant to this scenario.

4.1.9 Social Networks

The data traffic generated by social networks has several characteristics that defeat existing acceleration techniques: they tend to be highly dynamic and personalized, they are transmitted over encrypted streams to protect privacy, and they feature immense diversity in the nature of content that is shared.

In an embodiment, the ability to accelerate diverse types of content effectively as described herein means increased membership and user engagement for social networks.

4.1.10 Real-Time Interactive Applications

Instant messaging, collaborative editing, cloud-based productivity software and similar other interactive applications involve heavy network activity. Such applications store application states in a remote server and present their users with a consistent view of the current state of the information. For example, an instant messaging application may have to receive and transmit text messages, images, voice, and video in real-time to two or more participants in a chat session. All participants of the chat session have an expectation of instantaneous communication. Thus, timeliness is very crucial.

Collaborative editing involves multiple users who may be geographically distributed and modifying the same file. The nature of content could again be text, images, video, audio, etc.

With interactive applications the best performance can be achieved only if both the download and upload paths are handled efficiently. Thus, in an embodiment, optimizations can be used that involve both handset-based interventions such as choice of request mechanisms and server-based optimizations such as transport and session oriented techniques are very effective.

4.1.11 File Exchange Applications

With the proliferation of computing devices, a key issue has been sharing files across devices. A user may work on different devices at home, on the move, and while at work. Thus, applications for file exchange between devices and users have become immensely popular. There are two primary tasks for such applications: keeping a consistent view of a pre-determined set of files across devices and providing a high-performance mechanism to share new files. Given the diversity in file size, nature of content in files, and devices on which users interact, acceleration of such applications can benefit a greatly from the cognitive approach described herein.

Acceleration of such applications improves productivity for business users.

4.1.12 Cloud Hosted Services

With enterprise applications and consumer applications increasingly hosted in the cloud computing infrastructure, easy access to information and services in the cloud invariably means ironing out network performance issues, e.g., Salesforce.com is a popular cloud-based service that allows businesses to manage customer relationships. Having fast access to data on such cloud services has a direct impact on productivity of salespersons. Embodiments described herein accomplish this.

4.1.13 Analytics

Application designers and developers can make informed choices with the help of analytics. Examples of such information include, but are not limited to, any of: the right content quality for a particular target market, right values of parameters such as idle timers, etc. Such an informed design improves user experience. The cognitive engine described herein can serve as a knowledge store for such scenarios.

4.1.14 Location-Based Services

The state of the art in location-based services features two extreme choices: either source accurate location information with the user's consent or rely on inaccurate mapping of IP addresses to geographic locations. By combining network characteristics in the aggregate, an embodiment can improve the accuracy of location detection without relying on personally identifiable information. For example, a location specified with an accuracy of one or a set of cell tower coverage areas provides a better accuracy than what a geo-IP mapping provides. This could be inferred by finding patterns in the manner in which operators manage their public IP address pools.

4.1.15 Network Planning and Management

Network planning and management involves several decisions that impact user experience and application performance. The goal of the network operator is to find a good balance between user experience and cost of operation. However, the operators do not have a good input in terms of user experience. Even when they do, they are not able to correlate such data to network planning and management decisions. An embodiment can detect the middle box behaviors that cause an adverse impact on application performance. This kind of correlation can help operators tune the network to achieve the same goals in a better way. This improves customer satisfaction and improves subscriber growth and retention for network operators.

4.1.16 Scenario-Driven Software Testing

Modern applications are designed and launched for multiple markets. Often, such markets feature diverse network characteristics. The unintended impact is that user-experience varies widely with the same application across different markets. From a business perspective this is a negative because the application is not performing to its best potential in every market. The inferences described herein can help mitigate this problem by enabling creation of simulated testbeds that can accurately predict the performance of applications in various geographies or networks or markets or any other way they could be parameterized.

4.2 Techniques that Help Describe the Operating Context

4.2.4 Discovering the Type of Access Network

In certain conditions or setups, the type of access network (e.g., 3G, 4G, LTE, etc.) cannot be readily discovered but is rather inferred through measurements and observations.

In an embodiment, the Round-Trip-Time (RTT) estimate can be a good information tool to describe the network technology. The system can use prior measurements or well-known properties of the networks to carve out RTT bounds for different access technology. For example, while on a cellular network any measurements may lead the system to predict a set of thresholds, e.g., an RTT of less than 100 ms being indicative of LTE, an RTT between 100 ms-250 ms might be detected as being indicative of 3G/HSPA/HSDPA/HSUDPA network, etc.

In an embodiment, the originating IP address can also be used to detect access network type. Typically, the IP termination point for each access network category is different, for example, the LTE connections are terminated on S/P gateways and 3G/HSPA type networks are terminated on SGSNs/GGSNs. For each of these termination points, the IP address ranges (whether public or private) may be found to be separate. If the IP address ranges and mappings are retrieved from a well-known entity or discovered through an algorithm that observes transit traffic, then the embodiment can discover the access network type.

In an embodiment, bandwidth measurements can be used to detect the access network type. The maximum, average and minimum bandwidth for any access network is widely known and further supported by various published studies. An embodiment can measure the bandwidth in either direction (downstream or upstream) using well-known algorithms and use the resulting value to look into an information database of pre-existing bandwidth ranges to map them to an access technology. Further such a database may be continually adapted based on measurements from transit traffic.

In an embodiment, if there are methods to detect information regarding the cellular or access point then this can also be used to discover access network technology. For example, if the cellular tower or access point information is known and it is described that this particular access point only provides a particular access technology like 3G/HSPA then we can use this information to ascertain the access technology.

In an embodiment, ITU-T standards require that every network and its carrier use a uniquely identifiable number like MCC (Mobile Country Code) and MNC (Mobile Network Code). The embodiment can use this MCC and MNC information, where available, to provide more information about the access network technology is being used.

In an embodiment, a combination of embodiments described above can be used to prune errors and further solidify the methods to prescribe the access network technology. For example, the IP address ranges that correspond to a unique access network technology may be deduced using information obtained from a subset of devices that provide direct evidence such as the cellular tower information. So even in scenarios where the direct evidence is unavailable, corroborating evidence may be used for a deduction.

4.2.2 Discovering the Upstream and Downstream Bandwidth of the Access Network The bandwidths for the upstream (from device to the cloud/content-server) and downstream (from cloud to device) segments have fairly different characteristics and need to be inferred separately.

In an embodiment, bandwidth can be inferred through active measurements. These measurements can be both in-band, e.g., done inside an existing session/connection or can be an offline measurement, e.g., a separate session is maintained to estimate bandwidth. One of the active measurement methods would be to observe packets transmitted back-to-back from the device/server and measure the gap in their inter-arrival time at the other end. This gap represents the time to process the first series of packet on the slowest link of the network. The bandwidth can be inferred as the ratio of size of the packet(s) and the inter-arrival gap. This exercise is carried out on the device side to estimate the downstream traffic and at the cloud server for the upstream traffic.

In an embodiment, TCP headers have a field called a timestamp through which the system can deduce if the packets were sent around the same time. Usually, on the device side, the TCP headers are not available. In the absence of this information it is very difficult to estimate which packets were sent back-to-back. For this reason the system may choose to run an out-of-band connection to specifically measure the bandwidth in either direction.

In an embodiment, the signal strength sometimes can be a proxy for the available bandwidth. If the signal strength can be obtained and if the access network technology is known then the theoretical bounds for the bandwidth can be calculated by the access network technology's specification which usually details how the bandwidth degrades with signal to noise ratio.

In an embodiment, if the cellular base station or access point's identity is known and if the location of the device is also available then this information can be used together to calculate a proxy value for the signal strength (if it is not available). This information can then be plugged into the method described above to infer the bandwidth.

In an embodiment, a coarse bandwidth estimate can sometimes be read through some API calls available on a device. This is usually provided by the operating system as a part of its monitoring of the traffic flow on the network interfaces. The system can use these values as a coarse estimate for the bandwidth.

In an embodiment, today there exists a few software solutions that artificially restrict/constrain the bandwidth based on a variety of factors that include, but are not limited to, any combination of: application type, user, access network, etc. These bandwidth constraints are sometimes available through simple API calls and sometimes need to be deciphered. The system can run a variety of experiments to deduce these limits a. For example, to understand if the network constraints are for a particular application, the system can run traffic on another session/application to infer the bandwidth. In light of these two experiments the system can determine if there are some artificial constraints on one of the participating applications in the experiment.

b. Another method would be obfuscating the application name on the network so that the bandwidth constraint techniques do not pick up the application.

c. The system can also change or modify the time-domain characteristics of the application so that it is not easily picked up the filters/access rules on the bandwidth constraining device.

d. In case of the bandwidth constraints are applied on a per-user basis this information can be available as a part of the service operator's contract. For example, today AT&T is known to slow down certain users with unlimited data plans, when their usage goes beyond 3 GB per month. This inference can be made by looking at the policies of the service operator and the data usage of the operator.

4.2.3 Discovering the Location of the Device

There are two primary methods to discover the location of a device. In the first method, the device user explicitly shares the location of the device and it uses the on-device GPS coordinates to get the location. In the second method, when the user does not share the location, the IP address of the device is used to detect the location. However, when a device is on a cellular network the second method that relies on IP address is very imprecise.

In an embodiment, if the device or the operating system exposes methods to query the available nearby wireless networks, then the system can use this information to query existing databases that map the MAC address of the wireless access points or some other similar information to the location. The databases the system queries could be a third party database or could be a database generated by the system or service.

In an embodiment, if a device explicitly shared its location then the system can store that information in a database. The system can then use this database to generate an algorithm, which correlates this with other observed variables such as how the service provider allocates IP addresses to different devices/users. Thereafter, for any new request the system can employ this algorithm to get a better estimate of the location from a set of available values for the variables such as the IP address of the device.

In an embodiment, the device or the operating system may expose methods to uniquely identify the cellular tower location. The system can use this information together with the signal strength received on the device to identify a more accurate location of the device. In cases where the signal strength cannot be identified the system can use the round-trip time and bandwidth as a proxy for signal strength.

In an embodiment, for applications where there is no requirement for a specific location, rather, just a weaker requirement (e.g., ability to distinguish two locations even if the system does not know the locations themselves), there are a variety of techniques that can leverage data for signatures that are proxy for a weaker assertion on the location. Even if the system does not know the specific location the system can associate unique attributes to a location to distinguish it from another location.

4.3 Helping Acceleration of Content Delivery

With TCP it takes several round-trips between the device and the content origin before the real bandwidth is discovered. With prior data for a particular context the rate at which TCP transmits can be quickly adapted (higher or lower). The TCP stack enhanced with prior data operates differently at each stage of the connection lifetime and with each significant event in the network:

a. At the start of the connection it begins much closer to the "right" value for the bandwidth for that particular context.

b. During the life of the connection it makes quick and precise judgments on increase or decrease in transmit rate with the benefit of known priors on capabilities of the network.

c. On receipt of significant events such as increases in latency, loss of packets, and repeated transmission of data it avoids over-cautious remedies by properly detecting whether the events signify a trend that describes a serious issue or a transient issue.

d. Connection lifetime value is maximized by known prior characteristics of the application by avoiding unnecessary repeated costs in setup and teardown.

There are a variety of operating parameters for the transport mechanisms involved in a data transfer session (typical mechanisms include, but are not limited to, any of: TCP, HTTP or HTTPS, SSL, other encrypted streams or other proprietary protocols on top of TCP, etc.). The data helps in picking the right combination of operating parameters on a network scale across the server, handset (device), and network.

For certain operating contexts the data may indicate better results with different combinations of transport mechanisms, for example, an encrypted stream on top of TCP instead of a clear stream on top of TCP.

For certain applications or request types, optimization techniques such as caching may yield benefits. A request processor in the cloud backend uses the data to decide which optimization strategies add to the path of the traffic. If a certain application features a large amount of static content, caching may be very effective.

4.4 Efficient Content Delivery

An embodiment enables a content delivery system to determine the quality of content to be served to a device. As discussed herein, the location of the device can be determined in addition to the network and usage patterns for specific locations, geographical areas, etc. The patterns may be as specific as, e.g., the time of day, the day of the week, the month, the street, the area/neighborhood of a city, etc. For example, the system may determine that on Mondays in March, on the corner of 5th St. and Market St., in the city of San Francisco, Calif. , and between the hours of 2 PM and 4 PM, cellular network XYZ typically has a 30% lower throughput than normal.

Depending on the patterns that the system has detected it can intelligently decide what can be reliably delivered in a given time budget. That could mean, e.g., choosing to deliver a better quality ad in a good network, or choosing to deliver a video in 360p instead of 480p in a lower quality network, etc.

In an embodiment, determined patterns may be used to repackage an app/webpage on demand, e.g., content can be added or removed from an app/webpage depending upon the assessment of the network, etc. Determined patterns may be used to reconfigure an app/webpage on demand, e.g., an app may be reconfigured to call/invoke an API provided by the system in order to determine a quality of data to be delivered, etc. The system can provide infinitely customized optimization of apps/webpages. The app/webpage can evolve independently of the networking/wireless/phone technologies and the system can continually and automatically optimize the app/webpage for different network conditions. An embodiment can use the information calculated by the system to determine an application's performance/revenue breakdown based on a host of parameters, e.g., operator, network (e.g., 3G, 4G, LTE, etc.), time of day, location, etc. The performance/revenue breakdown information could be used to architect the application better, e.g., if large objects are not making it in time to be useful in a particular location, thereby causing a drop in revenue, the application architect could decide to rely on heuristics to deliver smaller objects in such locations to drive up desirable outcomes.

The application provider can give the system (and/or the system can derive) multiple objects along with an object-map which the system can use to render an app/webpage on the fly. For example, an embodiment may obtain different image sizes or different images, which the system can pick and choose from depending on the system's assessment of the network.

An embodiment can utilize the data and/or inferences the system calculates to create an accurate map of a user's location. Typically, if the user shares his/her location, then that is a best answer, however, he/she may decide not to share the location information, and then the system can detect his/her location based on the data the system has collected.

In an embodiment, as described above, the system can use the data and/or inferences it calculates to determine capacity constraints inside an operator's (e.g., AT&T, Verizon, etc.) network. Using the transactions the system processes/accelerates, it can build a very finely grained network imprint (e.g., in a database, etc.) which can characterize an operator's network in multiple ways, e.g., it can show capacity constraints, identify appliances which are not performing well, routing issues, etc. This imprint information can be a used as a capacity planning tool for the operators.

In an embodiment, the system can use the data and/or inferences it calculates to build a test bed which could be used by application providers to test their performance in parts of the network. The providers can determine how their applications run in a network simulator that uses the data and/or inferences to simulate parts of the network that the provider is interested in testing. The results from the test runs can help the provider make efficiency modifications or changes to make the application run more efficiently in the network in light of any constraints indicated by the data and/or inferences.

Embodiments include an apparatus comprising a processor and configured to perform any one of the foregoing methods.

Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

5. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
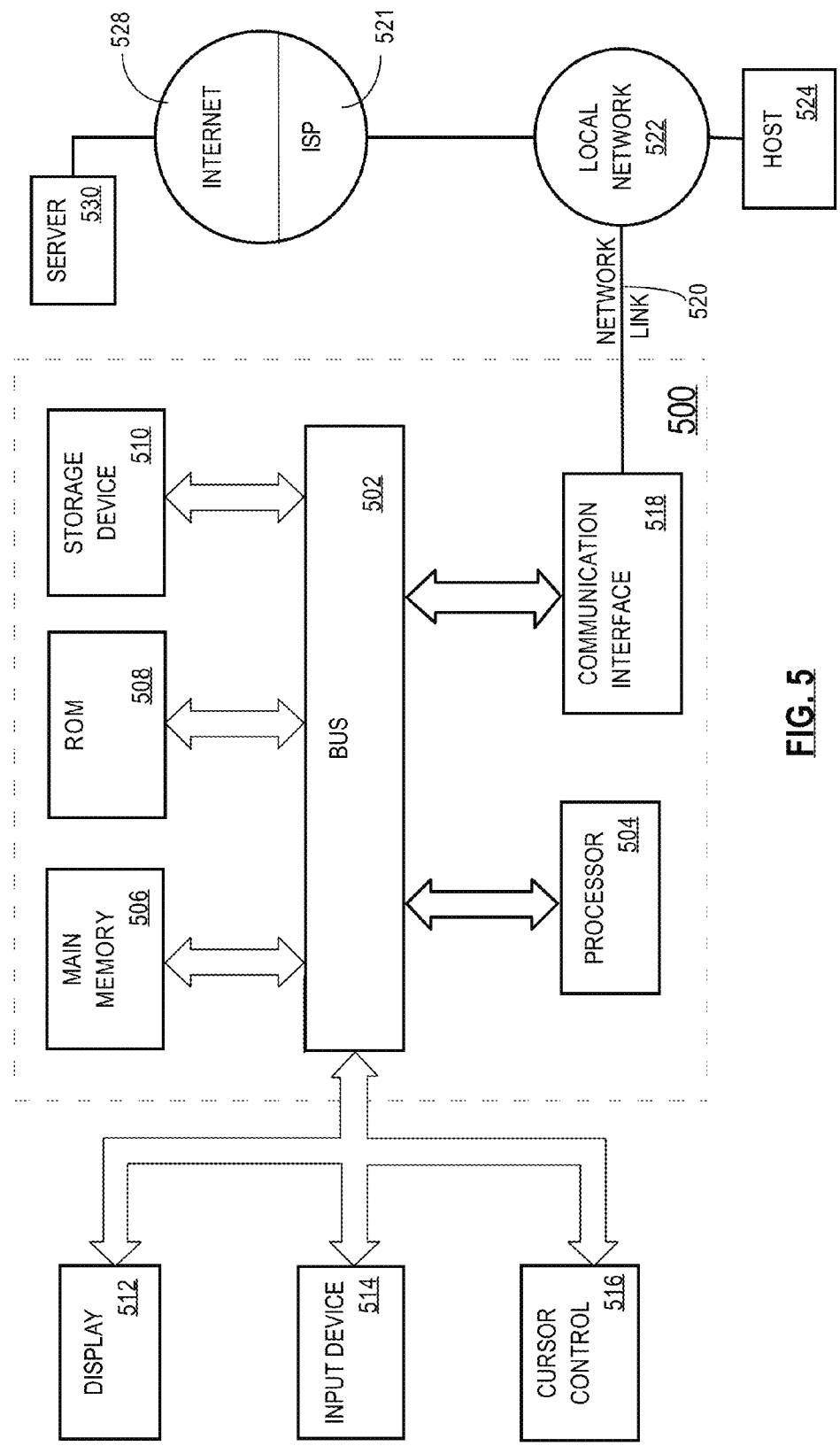
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving network traffic destined for a plurality of end devices;
   evaluating network related performance data to define traffic characteristics;
   automatically adjusting aspects of a data delivery session of a portion of the received network traffic to a subset of the plurality of devices based on at least one of: the defined traffic characteristics or historical network information;
   wherein the adjusting of the aspects of the data delivery session includes adjusting a delivery method;
   evaluating the adjusted delivery method for effectiveness using network related performance data received after the adjustment of the delivery method;
   based on the evaluation of the adjusted delivery method, further adjusting the adjusted delivery method to improve network delivery of received network traffic destined for the subset of the plurality of devices.

2. The method as recited in claim 1, further comprising:
   instructing at least one agent in at least one end device to perform a set of particular performance strategies.

3. The method as recited in claim 1, further comprising:
   defining an equivalence between different network related performance data parameters;
   producing a list of equivalent network related performance data parameter combinations that are strongly correlated to observed performance metrics.

4. The method as recited in claim 3, wherein the adjusting of the delivery method uses the list of equivalent network related performance data parameter combinations and the defined traffic characteristics.

5. The method as recited in claim 3, wherein the adjusting of the aspects of the data delivery session includes adjusting a request method, and wherein the adjusting of the request method uses the list of equivalent network related performance data parameter combinations and the defined traffic characteristics.

6. The method as recited in claim 1, further comprising:
   categorizing deviations from observed historical performance as either transient events or prolonged problems in a network.

7. The method as recited in claim 1, wherein agents installed in at least a portion of the plurality of end devices provide network related performance data.

8. The method as recited in claim 1, further comprising:
   wherein the adjusting of the aspects of the data delivery session includes adjusting a request method;

further adjusting the adjusted request method to improve network delivery of received network traffic destined for the subset of the plurality of devices.

9. The method as recited in claim 1, wherein characteristics of an end device are used to adjust the delivery method for the end device in absence of an installed agent on the end device.

10. The method as recited in claim 1, wherein the adjusting of the aspects of the data delivery session includes adjusting a request method, and wherein characteristics of an end device are used to adjust the request method for the end device in absence of an installed agent on the end device.

11. An apparatus, comprising:
a network traffic receiver subsystem, implemented at least partially in hardware, that receives network traffic destined for a plurality of end devices;
an evaluation subsystem, implemented at least partially in hardware, that evaluates network related performance data to define traffic characteristics;
an adjustment subsystem, implemented at least partially in hardware, that automatically adjusts aspects of a data delivery session of a portion of the received network traffic to a subset of the plurality of devices based on at least one of: the defined traffic characteristics or historical network information;
wherein the adjusting of the aspects of the data delivery session includes adjusting a delivery method;
a subsystem, implemented at least partially in hardware, that evaluates the adjusted delivery method for effectiveness using network related performance data received after the adjustment of the delivery method;
a subsystem, implemented at least partially in hardware, that, based on the evaluation of the adjusted delivery method, further adjusts the adjusted delivery method to improve network delivery of received network traffic destined for the subset of the plurality of devices.

12. The apparatus as recited in claim 11, further comprising:
a subsystem, implemented at least partially in hardware, that instructs at least one agent in at least one end device to perform a set of particular performance strategies.

13. The apparatus as recited in claim 11, further comprising:
a subsystem, implemented at least partially in hardware, that defines an equivalence between different network related performance data parameters;
a subsystem, implemented at least partially in hardware, that produces a list of equivalent network related performance data parameter combinations that are strongly correlated to observed performance metrics.

14. The apparatus as recited in claim 11, wherein characteristics of an end device are used to adjust a delivery method for the end device in absence of an installed agent on the end device.

15. The apparatus as recited in claim 11, wherein the adjusting of the aspects of the data delivery session includes adjusting a request method, and wherein characteristics of an end device are used to adjust the request method for the end device in absence of an installed agent on the end device.

16. A method, comprising:
receiving network traffic destined for a plurality of end devices;
evaluating network related performance data to define traffic characteristics;
automatically adjusting aspects of a data delivery session of a portion of the received network traffic to a subset of the plurality of devices based on at least one of: the defined traffic characteristics or historical network information;
wherein the adjusting of the aspects of the data delivery session includes adjusting a request method;
evaluating the adjusted request method for effectiveness using network related performance data received after the adjustment of the request method;
based on the evaluation of the adjusted request method, further adjusting the adjusted request method to improve network delivery of received network traffic destined for the a subset of the plurality of devices.

17. The method as recited in claim 16, further comprising:
instructing at least one agent in at least one end device to perform a set of particular performance strategies.

18. The method as recited in claim 16, further comprising:
defining an equivalence between different network related performance data parameters;
producing a list of equivalent network related performance data parameter combinations that are strongly correlated to observed performance metrics.

19. The method as recited in claim 18, wherein the adjusting of the aspects of the data delivery session includes adjusting a delivery method, and wherein the adjusting of the delivery method uses the list of equivalent network related performance data parameter combinations and the defined traffic characteristics.

20. The method as recited in claim 18, wherein the adjusting of the request method uses the list of equivalent network related performance data parameter combinations and the defined traffic characteristics.

21. The method as recited in claim 16, further comprising:
categorizing deviations from observed historical performance as either transient events or prolonged problems in a network.

22. The method as recited in claim 16, further comprising:
wherein the adjusting of the aspects of the data delivery session includes adjusting a delivery method;
evaluating the adjusted delivery method for effectiveness using network related performance data received after the adjustment of the delivery method;
further adjusting the adjusted delivery method to improve network delivery of received network traffic destined for the a subset of the plurality of devices.

23. The method as recited in claim 16, wherein the adjusting of the aspects of the data delivery session includes adjusting a delivery method, and wherein characteristics of an end device are used to adjust the delivery method for the end device in absence of an installed agent on the end device.

24. The method as recited in claim 16, wherein characteristics of an end device are used to adjust the request method for the end device in absence of an installed agent on the end device.

25. The method as recited in claim 16, wherein agents installed in at least a portion of the plurality of end devices provide network related performance data.

26. An apparatus, comprising:
a network traffic receiver subsystem, implemented at least partially in hardware, that receives network traffic destined for a plurality of end devices;
an evaluation subsystem, implemented at least partially in hardware, that evaluates network related performance data to define traffic characteristics;
an adjustment subsystem, implemented at least partially in hardware, that automatically adjusts aspects of a data delivery session of a portion of the received network traffic to a subset of the plurality of devices based on at least one of: the defined traffic characteristics or historical network information;

wherein the adjusting of the aspects of the data delivery session includes adjusting a request method;

a subsystem, implemented at least partially in hardware, that evaluates the adjusted request method for effectiveness using network related performance data received after the adjustment of the request method;

a subsystem, implemented at least partially in hardware, that, based on the evaluation of the adjusted request method, further adjusts the adjusted request method to improve network delivery of received network traffic destined for the a subset of the plurality of devices.

27. The apparatus as recited in claim 26, further comprising:

a subsystem, implemented at least partially in hardware, that instructs at least one agent in at least one end device to perform a set of particular performance strategies.

28. The apparatus as recited in claim 26, further comprising:

a subsystem, implemented at least partially in hardware, that defines an equivalence between different network related performance data parameters;

a subsystem, implemented at least partially in hardware, that produces a list of equivalent network related performance data parameter combinations that are strongly correlated to observed performance metrics.

29. The apparatus as recited in claim 26, wherein characteristics of an end device are used to adjust the request method for the end device in absence of an installed agent on the end device.

30. The apparatus as recited in claim 26, wherein agents installed in at least a portion of the plurality of end devices provide network related performance data.

* * * * *